United States Patent Office 2,788,392
Patented Apr. 9, 1957

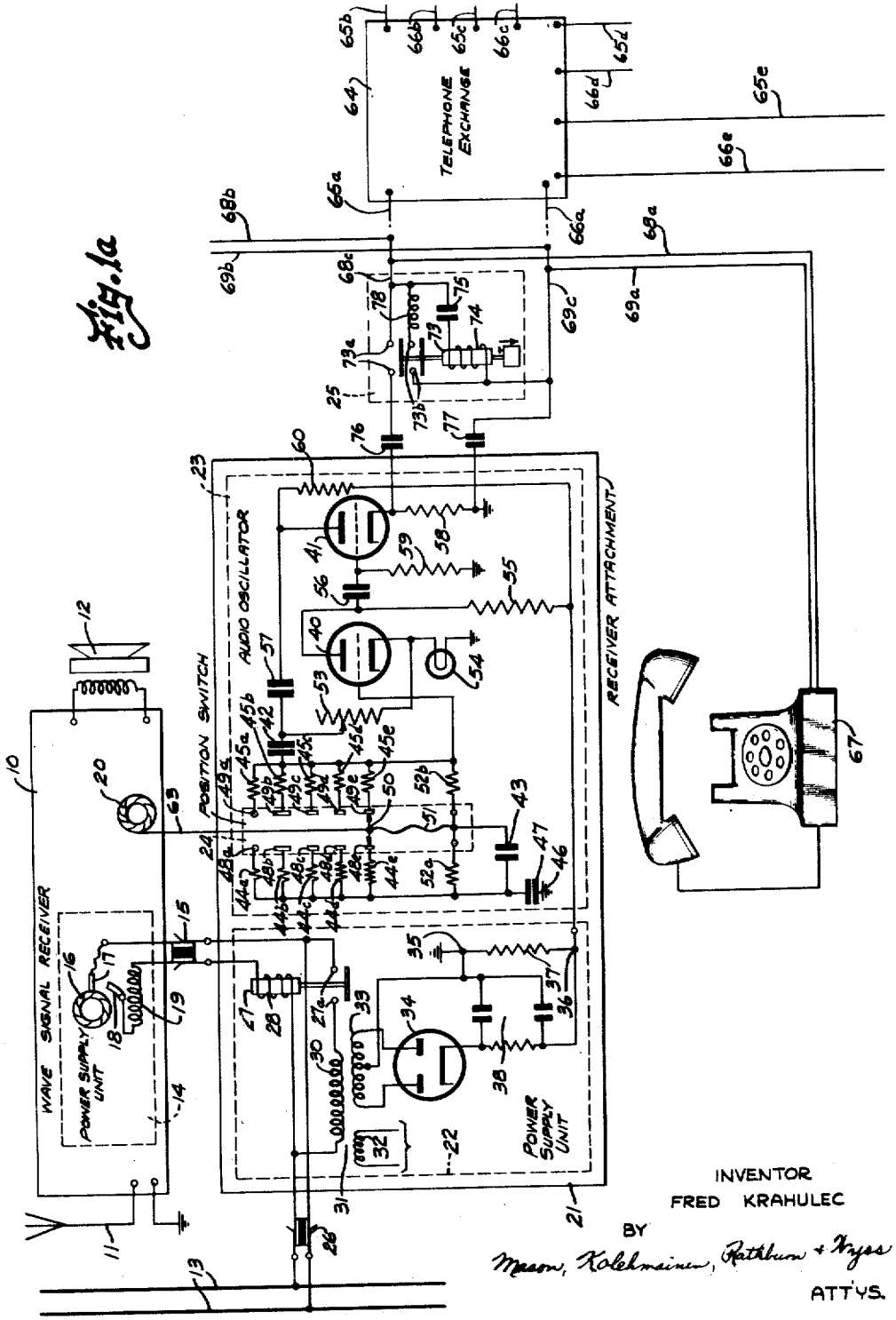

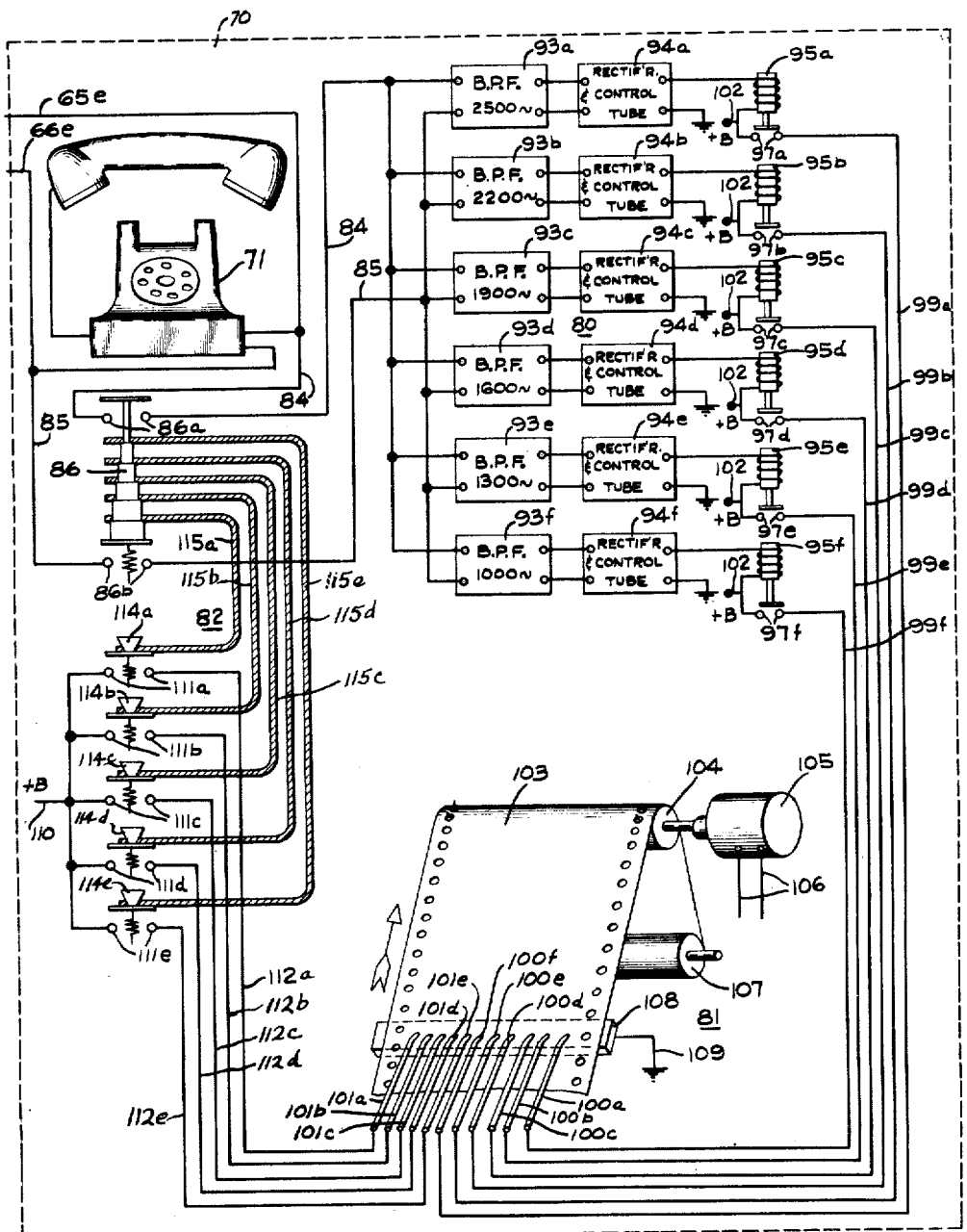

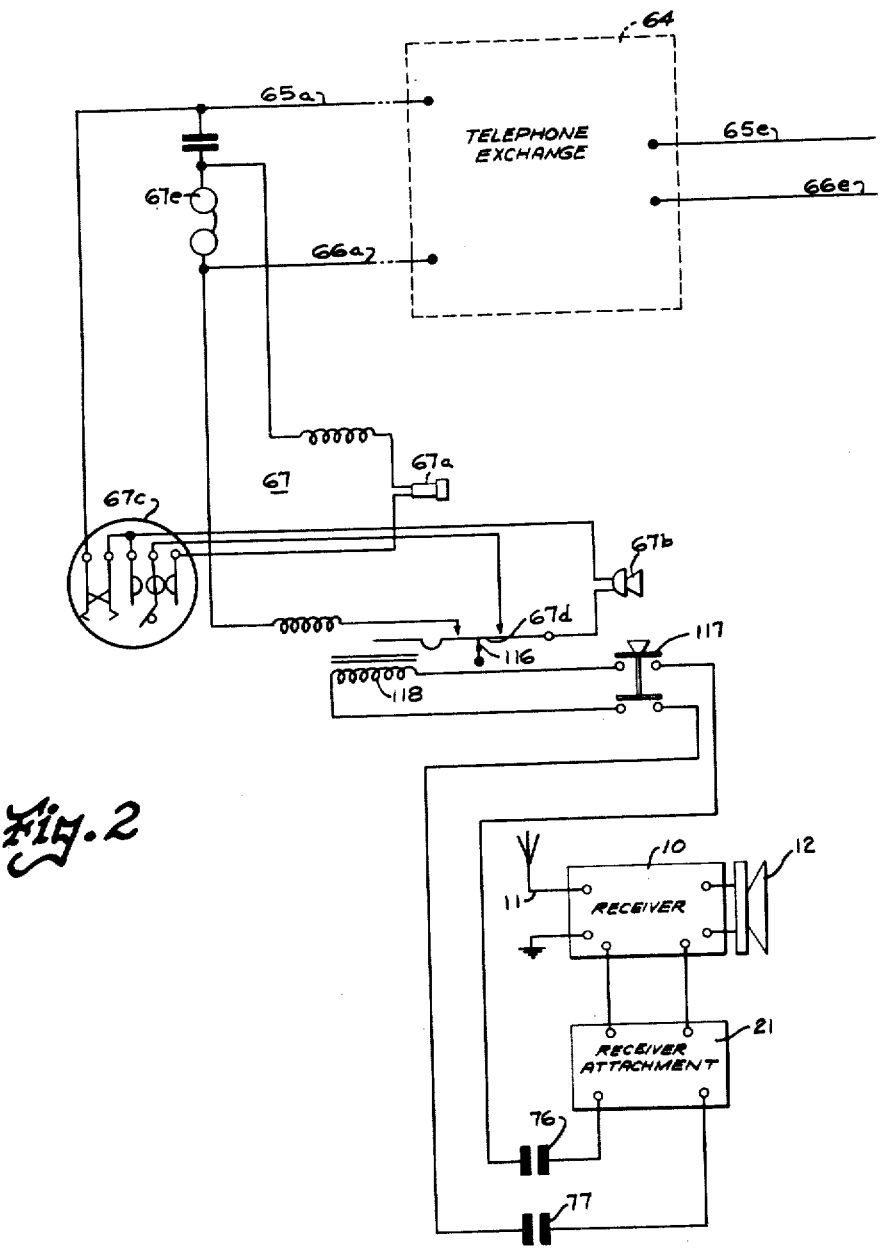

2,788,392

APPARATUS FOR INDICATING AT A REMOTE POINT THE TUNING CONDITIONS OF WAVE SIGNAL RECEIVERS

Fred Krahulec, Skokie, Ill., assignor to A. C. Nielsen Company, Chicago, Ill., a corporation of Illinois Application January 10, 1951, Serial No. 205,375

9 Claims. (Cl. 179—2)

The present invention relates to apparatus and a system for indicating at a remote point the tuning condition of one or more wave signal receivers.

It is an established fact that instrumented methods of determining the listening or viewing habits of users of wave signal receivers is the only satisfactory way of obtaining accurate information in this regard. In many cases it is desirable that the information with respect to the tuning condition of a plurality of wave signal receivers be instantaneously available at a central station or a central point remote from the place or places where the receivers are located so that the analysis organization which controls such central station or central point and which prepares an analysis of the listening or viewing habits of wave signal receiver users from data obtained by such instrumented methods can have this information to prepare reports with a minimum of delay. It will be understood that if it is necessary to record the information at the various homes in which wave signal receiver use is to be logged, that the gathering of the recorded information at the end of each day, for example, is, if not impossible, at least prohibitive from the cost standpoint. It will be apparent that if the records produced with respect to the tuning condition of such wave signal receivers being monitored are permitted to accumulate for a predetermined calendar period such as one week, two weeks, or longer, a substantial delay in the report which is eventually prepared based on the facts or data obtained by the instrumented methods is immediately introduced. Thus it is particularly desirable, especially in an area where a substantial number of homes are to be logged, to have an arrangement whereby the information with respect to the tuning condition of these different receivers is either instantaneously available or available at periodic intervals, preferably not to exceed twenty-four hours.

Instrumented methods of determining the listening or viewing habits of home receiver users whether the receivers be radio, television, frequency modulation, or a combination of one or more of these, generally involve the use of a recording device operating in conjunction with each receiver used in the sample representing the radio and television audience to record the extent of use of each such receiver as a function of time and the particular wave signal transmitters to which the receiver is tuned for program reception. Conventionally, such a device comprises a movable record receiving element, such as a movable paper tape, magnetic tape or wire, film, or other recording medium, although it might similarly comprise mere indicating means, the indications of which may or may not be recorded.

Where a plurality of receivers, each capable of being tuned to a plurality of different transmitters, are involved, it is of course necessary to obtain at the central station unique identification of the receiver as well as indentification of the transmitting station to which the receiver is tuned from time to time for signal reception. In copending Rahmel application Serial No. 157,712, filed April 24, 1950, and assigned to the same assignee as the present application, there is disclosed an arrangement whereby the tuning condition of a plurality of wave signal receivers is continuously provided at a central station. This is accomplished by providing signals uniquely identifying not only the receivers under consideration, but also the transmitting stations to which they are tuned. This information is transmitted between the respective homes and the central station by means of leased lines, as for example, leased telephone lines. As was pointed out in the above-mentioned copending Rahmel application, the economics of using leased telephone lines depends upon the telephone rate structure involved, and if the leasing charges are relatively high, other means must be resorted to. It is a well known fact that in a fairly high percentage of homes of this country, there is already available a conventional telephone with the associated telephone subscriber's line connecting that telephone with a telephone exchange, which in turn is part of the telephone system of not only the United States but the world. In view of the fact that the charges made by the telephone companies for leased lines have been relatively high, it would be desirable to provide an arrangement having similar end results with the arrangement disclosed in the above-mentioned Rahmel application but without the requirement of leased lines, while at the same time, affording the accuracy of instrumented methods as far as recording or indicating at a central point the listening or viewing habits of wave signal receiver users is concerned.

Accordingly, it is an object of the present invention to provide a new and improved apparatus for producing an indication or record of the listening habits of wave signal receiver users.

It is another object of the present invention to provide an apparatus for producing an indication or record of the listening habits of wave signal receiver users wherein the information is conveyed to a central point over leased telephone lines at greatly reduced costs.

It is another object of the present invention to provide an apparatus in which a record of information with respect to the tuning condition of a plurality of wave signal receivers is under the direct control of the central station at which this information is eventually recorded or indicated.

Still another object of the present invention resides in the provision of apparatus including automatic equipment located at the home in which the receiver to be monitored is located which will feed the desired information with respect to the tuning condition of the receiver being monitored into the ordinary subscriber's telephone line connected with that home upon demand from a central station or central office.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Figs. 1a and 1b are diagrammatic illustrations showing first and second parts of a system and apparatus employing the present invention arranged so as to be united into a single disclosure; and Fig. 2 is a similar view of a portion of a system representing a modification of the arrangement shown in Fig. 1a and adapted to be united with Fig. 1b into a single disclosure.

Essentially, the present invention comprises a receiver attachment for each receiver which converts the tuning position of the associated receiver to an audio frequency signal, the different tuning positions being indicated by different audio frequencies. These different audio frequencies are capable of being transmitted over telephone lines to a central station where they are supplied to a suitable selecting and recording device automatically converting them to station indications. In accordance with the present invention, the information is fed to the central station over the conventional telephone system and an apparatus is provided for use with a conventional dial telephone system for dialing equipment associated with the receiver attachment to make this information available at the central station. The receiver identification is manually controlled by the operator who dials the equipment at the receiver being monitored whereby there is additionally provided receiver identification as well as identification of the radiated carrier or transmitter to which a receiver is tuned.

It should be understood that the present invention is particularly applicable to monitoring a plurality of receivers in an urban area where a relatively large number of sample homes are involved and conveying this information to a central station. However, it should also be understood that it is applicable wherever the home being monitored is provided with a telephone line and in certain cases, it may only be necessary in the case of a non-telephone home to provide party line service to the home. For the purpose of simplifying the disclosure, a detailed description of only a single receiver being monitored is included, although it may be understood that a large number of receivers could be monitored either in the same or different homes with the same central station equipment. It will, furthermore, be understood that the sample homes which are determined on the basis of a statistical analysis may be single receiver or multi-receiver homes and if they are multi-receiver homes, all the receivers in the particular home under consideration must be monitored to give a true picture of the listening or viewing habits of the wave signal receiver users. The wave signal receivers being monitored may vary widely including console models, small table models and even portable models in some instances, and including radio, television and frequency modulation receivers.

Referring now to Figs. 1a and 1b of the drawings, a representative receiver is designated generally by the reference numeral 10 and is schematically illustrated as comprising an antenna ground circuit 11 and a signal reproducer 12 schematically indicated as a loud speaker, although in the case of a television receiver, this signal reproducer would obviously comprise a cathode ray tube. In general, such receivers are likely to be of the superheterodyne type, although as far as the present invention is concerned, it is immaterial whether this is or is not the case. It is assumed that the receiver 10 and similar receivers to be monitored with the present invention are each adapted to be connected to a conventional house wiring circuit designated by the reference numeral 13. The receiver 10 is indicated as comprising a power supply unit generally indicated at 14 which is connected by means of a plug connector 15 to a suitable source of power. The power supply unit 14 includes the conventional On-Off switch control knob 16 which preferably is combined with the manual volume control means in a conventional manner. As illustrated, the control knob 16 controls the On-Off switch comprising the contacts 17 and 18 which are connected in series with a suitable winding 19 which may comprise the primary winding of a suitable transformer. The receiver 10 is furthermore illustrated as comprising the conventional tuning knob 20 which is mounted on the end of a suitable tuning shaft not shown for controlling the position of the resonant frequency varying means such as the ganged condenser, if condenser tuning is employed, or the position of the iron cores, if permeability tuning is employed. It will be understood that the tuning shaft associated with the knob 20 may be positioned by push buttons or push buttons may be employed to control the tuning condition of the wave signal receiver 10 without in any way affecting the position of the rotatable tuning shaft. As will become apparent from the following description, the present invention is readily applicable to push button operated receivers whether they control the position of the tuning shaft or not.

If the wave signal receiver employs a tuning shaft which is positioned at various tuning positions whenever the receiver is tuned to transmitting stations whose radiated carrier is received by the receiver 10, it will be apparent that the position of the tuning shaft is indicative of the tuning condition of the receiver. Experience has shown that with a very high percentage of the receivers in use in homes today, a mechanical link can be connected to the dial drum or similar portion for converting the mechanical position of the tuning shaft to various positions of an associated device. For the purpose of simplifying the disclosure, the present invention has been specifically illustrated in that connection.

In view of the fact that the recording apparatus for recording the tuning condition of the receivers is located at a central station to be described hereinafter remote from the receiver itself, it is necessary to provide at each receiver apparatus which is capable of transmitting to a remote point information pertinent to the tuning condition of the associated receiver. Accordingly, at each receiver, there is provided a small and compact unit generally designated as 21, referred to hereinafter as the receiver attachment and capable of being disposed in the available cabinet space of the wave signal receiver. The receiver attachment 21 essentially comprises three units 22, 23, and 24 as follows: a power supply unit 22; an audio oscillator 23; and a position switch 24. Actually, the receiver attachment may also in accordance with the present invention, include an additional control relay unit generally designated at 25 which has been indicated in Fig. 1a as separate from the receiver attachment 21. Preferably, however, this control relay unit 25 will be included in the receiver attachment.

The power supply unit 22 is illustrated as being connected to a source of alternating current such as the house wiring circuit 13, through a suitable plug connector 26. In order that the receiver attachment 21 is energized, only when the receiver 10 is turned on, there is provided in the power supply unit 22 a relay 27 having its winding 28 connected in series with the combined volume control and On-Off switch 16 of the receiver 10. Consequently, whenever the wave signal receiver 10 is turned on, the flow of current to the receiver through the plug connectors 15 and 26 causes relay 27 to be energized to close its normally open contacts 27a. It will be apparent that with the arrangement described, the receiver attachment 20 may be applied to the receiver 10 as far as the electrical circuit thereof is concerned, merely by removing one portion of the plug connector 15 from the conventional power circuit 13 and instead applying the corresponding portion of the plug connector 26 of the power supply circuit 13 and connecting the plug connector 15 as shown in Fig. 1a of the drawings.

The contacts 27a of the relay 27 are illustrated as controlling the energization of the primary winding 30 of a transformer 31 having secondary windings 32 and 33, respectively. The secondary winding 32 preferably supplies the filament voltage for the electron discharge valves employed in the receiver attachment 21. The secondary winding 33, on the other hand, is connected to the anodes of a twin diode 34 connected in the circuit of a full wave rectifier so as to provide at the terminals 35 and 36 between which there is provided a resistor 37, a direct current potential suitably filtered as by means of a filtering unit 38.

In order to provide a signal uniquely representative of the tuning condition of the wave signal receiver 10 associated with the receiver attachment 21, there is provided the audio oscillator 23 which may be any suitable form of audio oscillator but which has been specifically illustrated as an RC oscillator of the Wien-bridge type. As illustrated, the audio oscillator 23 is identical with that disclosed in the above-mentioned copending Rahmel application and operates directly at audio frequencies. As illustrated, it comprises a two stage audio amplifier including triodes 40 and 41, respectively, and a resistance capacitance bridge generally referred to as an RC bridge which is at the same time regenerative and degenerative. The RC bridge comprises the capacitors 42 and 43 which are preferably identical in rating, and two sets of resistors generally designated by the reference numerals 44 and 45, one resistor from each set being adapted to be selectively rendered effective at any one time. The resistors 44 which are in a sense in parallel, but only one of which is effective at any time, are specifically designated as 44a, 44b, 44c, 44d and 44e. Similarly, the resistors 45 are designated as 45a, 45b, 45c, 45d and 45e. Resistors marked with the same subscript preferably have identical values of resistance, but the resistors having different subscripts differ from each other and as schematically illustrated having increasing values of resistance as the subscripts change from "a" to "e." One terminal of each of the resistors 44a to 44e is connected to a common lead connected to one terminal of the capacitor 43. As illustrated, this terminal is grounded as indicated at 46 through a suitable capacitor 47. The other ends of the resistors 44a to 44e are respectively connected to spaced contact members 48a, 48b, 48c, 48d and 48e of the position switch 24. Similarly, the resistors 45a to 45e inclusive have a common lead which is connected to one terminal of the capacitor 42. The other terminals of the resistors 45 are connected to spaced contact members 49a, 49b, 49c, 49d and 49e of the position switch 24 and are disposed in linear relationship opposite the corresponding contact members 48a, 48b, 48c, 48d and 48e so as to be engageable by a suitable sliding switch contact 50, the contacts with similar subscripts being simultaneously engaged. The sliding contact 50 is furthermore adapted to be connected by a flexible conductor 51 to the other terminal of the capacitor 43. On the other hand, the other terminal of the capacitor 42 is connected through a suitable adjustable resistor 53 to the cathode of the triode 40. The resistor 53 is preferably a feed-back resistor which is adjustable so that the feed-back may be adjusted to an optimum value. The flexible terminal 51 is also connected to the control electrode of the triode 40.

In order that an audio frequency is producible by the audio oscillator 23 when the sliding switch contact 50 is not in engagement with any of the associated contacts 48 and 49, and power is available at the terminals 35 and 36 of the power supply unit 22, there are provided a pair of resistors 52a and 52b which are connected in parallel with the respective resistors 44 and 45 rendered effective by the sliding switch contact 50. These resistors 52a and 52b are of such magnitude as to insure an audio frequency output of, for example, 1000 cycles from the audio oscillator 23, if no other pair of resistors 44 and 45 are connected in the circuit when the oscillator 23 is rendered effective.

For the purpose of improving the stability of the audio oscillator 23, there is preferably provided in the cathode circuit of the triode 40 a resistor 54 in the form of a low wattage lamp whose resistance varies with temperature. When the triode 40 attempts to draw more current, the temperature of the lamp 54 increases thereby effectively increasing the bias on the triode 40 and increasing the degenerative effect. Conseuqently, the resistor or lamp 54 tends automatically to hold the output of the oscillator constant and the distortion to a low value. The anode of the triode 40 is preferably connected to the terminal 36 of the power supply unit 22, which effectively is a source of +B potential, through a voltage dropping resistor 55. This voltage dropping resistor 55 is preferably proportioned so that the average current flowing through the resistor 54 falls on the "knee" of the lamp's temperature-resistance characteristic whereby the desired stabilizing effect occurs. The plate circuit of the triode 40 is connected by a suitable coupling condenser 56 to the control electrode of the triode 41. The anode of the triode 41 is connected by a coupling capacitor 57 with the RC bridge and specifically with the terminal of the condenser 42 connected to the adjustable resistor 53. The cathode of the triode 41 is grounded as indicated through a load resistor 58. A suitable grid leak for the triode 41 is provided by means of the resistor 59. The coupling capacitor 56 should be large if it is desired to maintain oscillation at low frequencies. Similarly, coupling capacitor 57 must be very large as it works into a very low resistance composed of the resistors 53 and 54 connected in series. Preferably, the capacitor 57 is an electrolytic capacitor and works satisfactorily in view of the fact that the direct current polarizing voltage is higher than the alternating current voltage which it must handle. The anode of the triode 41 is connected to the source of +B potential, or in other words, to the terminal 36 of the power supply unit 22 through a suitable voltage dropping resistor 60. The output of the audio frequency oscillator 23 is illustrated as being obtained from across the load resistor 58 in the cathode circuit of the triode 41.

It will be understood that the output frequency of the audio oscillator 23 may be controlled by varying the capacitance of the capacitors 42 and 43 or the resistance of the resistors 44 and 45 or both. When the capacitors 42 and 43 are equal and the particular resistors 44 and 45 which are rendered effective by the movable switch arm 50 are equal, and the resistors 52a and 52b are equal, then the frequency of the audio output of the audio oscillator 23 may be represented by the following expression:

$$f = \frac{1}{2\pi RC}$$

where R is the value in ohms of the parallel resistance circuit comprising the resistor 52a and the particular resistor 44 which is rendered effective as, for example, the resistor 44e for the position indicated in Fig. 1a of the drawings, and C is the capacitance in farads. If none of the resistors 44 and 45 are rendered effective for a particular setting, it will be apparent that R will comprise the resistance of the resistor 52a. For the purpose of the present invention, the resistors 44e and 45e preferably have a value such that the output frequency of the audio oscillator is approximtaely 1300 cycles and the resistance of the other resistors are decreased in value so that the frequency steps at the output of the audio oscillator 23 differ from each other by about 300 cycles with the highest frequency being produced when the resistors 44a and 45a are rendered effective. When only the resistors 52a and 52b are effective a lower frequency of the order of 1000 cycles or the like appears at the output of the audio oscillator 23 which is indicative of the fact that the wave signal receiver 10 is tuned to a station for which no specific channel is provided in the receiver attachment 21 or, in other words, to what may be termed as tuning to "all others stations." If a substantial amount of tuning of the receiver 10 is to "all others stations" then it will be desirable to provide additional switch positions for the switch 50 to determine specifically the tuning to such stations.

To control the output frequency of the audio oscillator 23 in dependence upon the tuning condition of the associated wave signal receiver 10, the slidable contact switch 50 of the position switch 24 which engages with the contacts 48 and 49 is connected by suitable means such as a Bowden wire or the like, generally indicated by the reference numeral 63, with a manual tuning knob 20 of the tuning shaft so that if the tuning condition of the wave signal receiver 10 is changed, the resistances in the RC bridge of the audio oscillator 23 are selectively tuned and consequently, the output frequencies of the audio oscillator are varied. Although the contacts 48 and 49 are schematically illustrated in fixed positions, it will be understood that these contacts are adjustably spaced so that any desired channels may be chosen within the limitations of the number provided for by the contacts 48 and 49.

It should be understood that in the event that the wave signal receiver 10 is provided with so called "push button tuning," suitable means will be provided to insure the connection of the proper resistors 44 and 45 in the RC bridge of the audio oscillator 23 in dependence upon the particular push button which is actuated. Although five frequency steps are illustrated for the audio oscillator 23 exclusive of the "all other stations" frequency condition, it will be apparent that a larger or smaller number may be employed depending upon the number of stations to which the wave signal receiver 10 is normally tuned. It will furthermore be understood that the various frequency steps of the audio output of the oscillator 23 may be representative of channels for the AM, FM or television bands or a combination thereof so that the tuning condition of the wave signal receiver regardless of the band to which it is tuned will be indicated by a predetermined audio frequency output of the audio oscillator 23.

It will be understood by those skilled in the art that although in the standard broadcast band, each station is assigned a band width of 10 kilocycles, the extreme limits of movement of the tuning shaft while remaining tuned to the same station, vary considerably for different stations. It is, of course, essential that regardless of the position of the tuning shaft, for example, of the receiver when tuned to a station which may be received over a considerable angular movement in the case of a rotary tuning shaft or linear movement in the case of longitudinally movable tuning means, that the same audio output of the oscillator 23 be obtained.

This is represented schematically in Fig. 1a of the drawings by variable widths for the contacts 48 and 49. Where the tuning shaft of the receiver may be moved over quite an angle while remaining tuned to the same station wide contacts 48 and 49 are provided for the associated channels in the audio oscillator 23. In other words, the switch comprising the spaced linearly arranged contacts 48 and 49 and the sliding contact 50 is designed to insure the proper audio frequency output for all positions of the tuning shaft of the receiver 10 that the particular channels provided for in the receiver attachment 21 can be received. Such an arrangement is disclosed and broadly claimed in Rahmel Patent 2,484,734 granted October 11, 1949 and assigned to the same assignee as the present application. It should be understood that the position switch 24 comprising the sliding contact 50 and the stationary contacts 48 and 49 is only schematically shown. A suitable switch for this purpose is disclosed and claimed in a copending application of Fred Krahulec, Serial No. 78,926, filed March 1, 1949 and assigned to the same assignee as the present application.

With the arrangement described thus far, the different tuning conditions of the wave signal receivers such as 10 are represented by different predetermined audio frequencies each different audio frequency being indicative of a different tuning condition of the associated wave signal receiver.

In order that a record may be produced at a remote point of the particular output frequency of the audio oscillator associated with each receiver so as to identify the receiver as well as the tuning condition thereof, each receiver attachment 20 has the output of its audio oscillator 23 connected to the conventional subscriber's telephone line connected between the home where the monitored receiver 10 is located and the conventional telephone exchange designated as 64 in Fig. 1a of the drawings. The subscriber's line leading between the particular home under consideration and the exchange 64 is represented by the conductors 65a—66a. Other pairs of subscriber's lines connected to the exchange 64 are designated by the reference numerals 65b—66b, 65c—66c, 65d—66d and 65e—66e. A conventional subscriber's subset 67 is connected to the subscriber's line 65a—66a, which is illustrated as a party line, through conductors 68a and 69a. The conductors 68b and 69b represent those leading to another subscriber on the party line 65a—66a while the conductors 68c and 69c represent those available to a third party and which are employed specifically in connection with the present invention as described hereinafter.

It is desired that the information with respect to the tuning condition of various wave signal receivers such as 10 be made available at a central station generally designated at 70 which is under the control of the analysis organization making the survey involving listening or viewing habits of wave signal receiver users. As illustrated, the central station includes a conventional telephone or subset 71 which is connected to the telephone exchange 64 by subscriber's line 65e—66e. To supply the information available at the output of the audio oscillators such as 23 to the central station 70 where it is desired for record purposes, it is necessary to provide telephonic connections between such oscillator 23 and the central station 70 for a sufficient period of time to furnish an accurate picture of the tuning condition of receivers such as 10 with respect to time. This is accomplished in accordance with the present invention by means of the relay unit 25 which is illustrated as comprising a relay 73 having a winding 74 and two sets of normally open contacts 73a and 73b. The relay is moreover indicated as an instantaneous pick up, time delay, drop out relay which upon deenergization will keep contacts 73a and 73b closed for a period of ten seconds or more. Winding 74 is connected across party line 68c—69c through a blocking condenser 75 and is capable of being energized by the conventional telephone ringing current which has a relatively low frequency. In order that one may energize relay 73 without ringing the telephone subset 67 or similar subset attached to party line 68b—69b, use is made of so called harmonic ringing well known to the telephone industry. For example, if a ringing current of 16⅔ cycles is fed over the telephone line subset 67 may respond by having its bell energized, whereas relay 73 would not be energized unless a ringing current of 33⅓ cycles flowed through the telephone line. The contacts 73a of relay 73 connect line 68c to one terminal of the load resistor 58 through a blocking condenser 76. The other terminal of the load resistor 58 is connected directly to telephone conductor 69c through blocking condenser 77. From the above described arrangement, it will be apparent that whenever the relay 73 is energized to close its contacts 73a, the audio frequency output of the audio oscillator 23 is capable of being transmitted to the telephone exchange 64 and hence to the central station 70.

In automatic telephone systems ringing current usually stops flowing when the receiver of the called party is picked up by virtue of the fact that a direct current path is completed across the line to permit actuation of a relay terminating operation of the source of ringing current. Relay unit 25 is provided with a similar arrangement whereby when contacts 73b are closed, a direct current path across line 68c—69c is completed through contacts 73b and a winding 78 having a very high impedance to audio frequencies of the order produced by oscillator 23. In effect, therefore, relay unit 25 is in many respects similar to an ordinary telephone subset such as 67 in that it may be reached by dialing a number just as other telephones connected to the exchange 64. Moreover, it is selective to a ringing current of a predetermined frequency so as to pick up only when this ringing current is produced by virtue of dialing a number assigned to relay unit 25 just as if it were a subscriber's telephone. When energized, relay unit 25 connects the party calling its dial or code number with the output of audio oscillator 23 to transmit the audio signal produced by the oscillator 23 to the calling party presumably located at central station 70. Since the ringing current is cut off when relay 73 closes its contacts 73b, the relay drops out after a predetermined time delay which is sufficient to transmit to the central station 70 the desired information.

For the purpose of recording or providing an indication of the tuning condition of the wave signal receiver 10 and any other wave signal receivers which are being monitored, there is provided at the central station 70 a filter and control unit generally designated at 80, a recorder generally designated at 81, and a manual switch arrangement generally designated at 82. In accordance with the present invention, the audio signal produced by the receiver attachment 21 is transmitted over the associated subscriber's line to the telephone exchange 64 and from theh telephone exchange 64 over the subscriber's line 65e—66e to the central station 70. This information is then supplied to the filter and control unit 80 through conductors 84 and 85 connected through the contacts 86a and 86b, respectively, of a suitable switch unit 86. When theh switch 86 is in the open position indicated, the control and filter unit 80 is disconnected and the subset 71 functions as an ordinary subscriber's telephone.

As illustrated, the filter and control unit 80 comprises a plurality of band pass filters 93a, 93b, 93c, 93d, 93e and 93f connected in parallel across the conductors 84 and 85. The output of each band pass filter is connected to an associated rectifier and control tube designated by the reference numeral 94 marked with an appropriate subscript corresponding with the subscript of the associated band pass filter and specifically designated as 94a, 94b, 94c, 94d, 94e and 94f. The outputs of the rectifier and control tubes 94 are applied to associated relays specifically designated as 95a, 95b, 95c, 95d, 95e and 95f, respectively. The band pass filters 93 are so designed that the filter 93a, for example, will pass only the frequency produced by the audio oscillator 23 when the contacts 48a and 49a are rendered effective. This is correspondingly true of the filters 93b, 93c, 93d and 93e. The filter 93f is provided to pass the signal produced by the audio oscillator 23 when the wave signal receiver 10 is turned on, but the position switch 50 is not in engagement with any of the contacts 48 and 49 of the position switch 24 or, in other words, the wave signal receiver 10 is tuned to what is generally termed "all others."

The signals passed by the band pass filters 93 may be used to operate certain indicators such as suitable lights or the like or may be applied to a suitable recorder. The recorder 81 may be considered a combined recorder and indicator since a permanent record is produced but at any time one may merely look at the record and get an indication of the tuning condition. Each of the filters 93 has its output connected to the particular rectifier and control unit 94 having the same subscript as the particular band pass filter. Moreover, the output of each of the rectifier and control tube units 94 is connected to the particular relays 95 marked with the same subscript. As illustrated, each of the relays 95 is provided with a set of contacts 97 also marked with the subscript corresponding with the particular relay with which they are associated. When no signal is passed by any of the band pass filters 93, the relays 95 are energized and the associated contacts 97 are open as indicated in the drawings. In the event that a signal is passed by one or more of the band pass filters 93, the associated relays are deenergized to close their respective contacts 97. The contacts 97 of each of the relays 95 are connected by conductors 99 marked with the appropriate subscript to an associated recording stylus 100 of the recorder 81 also marked with the same subscript. It should be understood that the type of recorder employed is immaterial as far as the present invention is concerned and the particular recorder shown in Fig. 1b of the drawings is by way of example only. As illustrated, the recorder 81 comprises eleven styli 100a, 100b, 100c, 100d, 100e, 100f, 101a, 101b, 101c, 101d and 101e. The styli 100a to 100f inclusive are connected by the conductors 99a to 99f to the contacts 97 marked with the same subscripts, thereby to connect the associated styli 100 to a source of +B potential specifically designed as 102 in Fig. 1b of the drawings. As further illustrated, the recorder 81 includes a movable record receiving element 103, continuous movement of which in the direction of the arrow, is caused by rotation of a sprocket 104. Preferably, this sprocket 104 is driven by a synchronous motor 105 connected to a suitable source of power 106 so as to be driven continuously whether or not any other elements at the monitoring or central station 70 are energized. The recorder 81 further includes a suitable take-up spool 107 and a tape supply spool not shown. By way of example, the record receiving element 103 may be a chemically treated element such as, for example, an electrolytic paper. When an electric current is passed through such a record receiving element 103, a chemical action occurs which produces a trace thereon at the point of current flow. To this end the record receiving element 103 passes over a contacting shoe 108 which is connected to ground as indicated at 109. It will be apparent, therefore, that whenever a potential such as the +B potential from the source 102 is applied to any of the styli 100, a current flows through the record receiving element 103 and the resultant chemical action causes a trace to be produced thereon beneath the contacting portion of the particular stylus which is energized since this contacting portion of the stylus is directly over the grounded conductor shoe 108. Due to the positioning of the styli 100 transversely of the record receiving element 103, the transverse position on the record receiving element of the trace produced by the styli 100 is indicative of the particular transmitting station to which the wave signal receiver being monitored is tuned.

For the purpose of uniquely identifying the particular receiver or receivers tuned to the transmitting stations producing record traces on the tape 103 beneath one or more of the styli 100, the styli 101 are connected respectively to a source of +B potential 110 through the contacts 111a, 111b, 111c, 111d, and 111e. These contacts are connected directly to the styli 101 by conductors 112, the interconnected elements being identified by reference numerals indicated by the same subscripts. The contacts 111 are controlled by manual switch means designated as 114 each marked with an appropriate subscript specifically 114a, 114b, 114c, 114d and 114e. As illustrated, each of the switches 114 is moreover connected by a suitable mechanical link designated as 115 marked with a suitable subscript to the switch 86 so that whenever one of the switches 114 is actuated manually, the switch 86 is also actuated. The switches 114, five of which are shown, each represent a particular receiver and when the operator dials a particular home to energize the relay 25 associated with that home and specifically the receiver being monitored in that home, the receiver attachment in that home is connected to the central station 70. Upon completing the call, the operator then depresses the particular switch 114 representative of the home or the particular receiver being called so that there will be produced on the record receiving element 103 not only a record of the particular receiver being monitored, but also the station to which the receiver is tuned and this is accomplished through the use of conventional subscriber's lines.

Considering briefly the operation of the present invention as illustrated in Figs. 1a and 1b, it will be apparent that whenever the receiver 10 is turned on, the audio oscillator 23 will put out a signal having a frequency of 2500, 2200, 1900, 1600, 1300 or 1000 cycles depending upon the station to which the receiver 10 is tuned. This signal is available across the load resistor 58. The operator at the central station will dial the numbers of various relay units such as the unit 25 associated with monitored receivers within the range of the central station 70 and as each relay unit 25 is dialed, it will connect the output of the audio oscillator 23 of the associated receiver attachment through subscriber's lines to the central station. Moreover, while doing this, the operator will also actuate the particular manual control switch 114 representative of the relay unit 25 which is being called and hence there will be provided not only an indication of the tuning condition of a plurality of receivers, but also a unique identification of the receiver and furthermore a recording of such information with respect to time. It will be understood that a suitable time mark, in addition to moving the tape at a uniform speed with respect to time, may be applied to the record receiving element 103 so that the particular tuning condition with respect to time is always known. Moreover, with the present arrangement, the expense involved is merely the conventional rate of subscriber's lines and in most cases it will be satisfactory to employ party line service. Under these conditions a busy signal may be obtained if the one or more other parties on the line are using their telephone necessitating the operator to recall the number at a later time. Since programs generally run for fifteen minute intervals, the operator may make calls every fifteen minutes during stated periods of the day when information with respect to the tuning conditions of certain receivers is desired. It should be understood, however, that such calls may be made at shorter intervals or longer if desired.

With the arrangement described thus far, the subscriber's telephone can be picked off the hook and if he is on a party line, he will feel that the line is in use for the short period of time that the operator is actuating the relay unit 25 to connect the output of the audio oscillator 23 to the central station 70. He will also, moreover, hear the output of the audio oscillator whatever it may be. If he is on a private line, he will attempt to dial and will also hear the audio signal. Due to the short period in which the operator at central station 70 utilizes the line to connect the output of the audio oscillator 23 to the central station, this should cause no difficulty, this period being of the order of ten seconds. If desired and particularly if required by the telephone company, the hook switch of the subset 67 may be provided with contacts to open the circuit to the relay unit 25 whenever the subscriber picks up the receiver of subset 67. Such a switch is disclosed schematically in Fig. 2 of the drawings and described briefly hereinafter. Under these conditions as far as the subscriber is concerned, the relay unit 25 might just as well not be on the line. However, if the relay unit 25 remains energized for a period of only about ten seconds, it would seem unnecessary to resort to this refinement of a switching arrangement whereby whenever the subscriber picks up the receiver of his phone, he automatically incapacitates the connection between the audio oscillator 23 and the telephone exchange 64.

Although there has been described an arrangement in which the relay unit 25 is selectively responsive to a ringing current of a predetermined frequency, the system could operate equally well if identical ringing current actuated the relay 25 and the subscriber's phone 67. In this case, whenever the home was called, the collaborator's phone would ring, but in most cases before he had time to pick up the receiver the relay unit 25 would have performed its function and transmitted the desired information to the central station 70. The disadvantage of such a system resides in disturbing the collaborator by ringing his telephone when all that is desired is to get the output of the audio oscillator 23 transmitted to the central station 70. However, if the analysis organization bears part of the expense of the subscriber's line, he may not object to the ringing of his phone when he specifically is not being called.

In Fig. 2 of the drawings, there is illustrated a modification of the present invention in which some collaborator participation is required, but when requires no connections with the telephone system at all and permits the use of ordinary subscriber's lines. The corresponding parts of Fig. 2 are designated by the same reference numerals as in Fig. 1a and as in Fig. 1a is adapted to be combined with Fig. 1b to provide a complete system. The subscriber's subset 67 is schematically shown and the component parts thereof are designated by the same reference numeral 67 with an appropriate subscript. For example, the receiver is designated as 67a, the mouth piece is 67b, dial mechanism is 67c, hook switch 67d and bell 67e. The hook switch 67d is indicated in the position it would assume when the receiver is in position and hence the circuit is open. The hook switch is moreover indicated as having a back contact designated as 116 which, as was mentioned above, may be connected in the circuit of the relay unit 25 as illustrated in Fig. 1a of the drawings to interrupt or render ineffective the relay unit 25 whenever the subscriber picks up the receiver of his subset 67.

The receiver 10 and receiver attachment 21 are schematically indicated in Fig. 2 of the drawings and are coupled by capacitors 76 and 77 through a manually actuable switch 117 to a pick up coil 118 which may be inductively related to the receiver 67 so as to transfer audio signals to and from the receiver 67 and hence to and from the telephone line. Whenever the manual switch 117 is actuated, the output of the receiver attachment 21 is effectively connected to the telephone line 65a—66a when the subset 67 has its circuit switch 67d closed. The manual switch 117 would be placed closely adjacent the subset 67 and when the analysis organization desires tuning information with respect to the receiver 10, they would merely utilize the subset 71 and call or dial a subscriber's subset 67. When the subscriber answered and picked up the receiver, the operator at the central station 70 would merely ask them to actuate the button 117 which would automatically connect the output of the receiver attachment through the inductive coupling 118 to the subset 67 and without any physical connections with the telephone permit the transmission of information over the subscriber's line. The actuation of the manual switch 117 is all that is required by the collaborator and this would require only a momentary actuation. Moreover, if no one answered the subscriber's phone in the home in which the receiver 10 being monitored is located, quite obviously there is no listening and even if the receiver were turned on, there would be no one there to hear or view the information brought in by the receiver. The operator at the analysis organization would again actuate the particular switch 114 representative of the receiver 10.

With the above described arrangement, it will be apparent that the operator could from the central station 70 periodically call a large number of homes and have available within a matter of a few minutes at a central location information with respect to a large number of wave signal receivers which information would be foolproof and enable the analysis organization to get out an analysis based on this data with no delay.

In view of the detailed description included above, the operation of the arrangement shown in Fig. 2 will readily be apparent and no further discussion thereof is included herewith. It will, moreover, be clear that the information is provided at a central station with the use of ordinary telephone subscriber line facilities and with very simple equipment which is positive and fool-proof in operation.

While there have been illustrated and described several embodiments of the present invention, it is not desired that the invention be limited to the construction shown and described, for it will, of course, be obvious to those skilled in the art, that various changes and modifications may be made without departing from the invention and it is therefore aimed in the appended claims to cover all such changes and modifications as fall within the true spirit and scope of this invention.

What is claimed as new and desired to be secured by Letters Patent of the United States is:

1. In a system for determining the listening or viewing habits of wave signal receiver users, the combination of a central station remote from the homes in which receiver use is to be monitored, telephone wire facilities interconnecting said homes and said central station, means at said central station for initiating the establishment of a connection with one of said homes over said telephone subscriber wire facilities, receiver tuning condition responsive means in said one home responsive to the tuning condition of the monitored receiver in said home for providing indications of receiver-on and receiver-tuning conditions, means at said monitored receiver for converting said indications to transmittable signals, means under the control of said means at said central station for connecting said means at said monitored receiver to said telephone subscriber wire facilities, and time delay means at said monitored receiver for interrupting said connections a predetermined time after the initiation thereof, thereby to transmit said signals to said central station for a predetermined time interval.

2. In a system for determining the listening or viewing habits of wave signal receiver users, the combination of a central station remotely located from a plurality of receivers to be monitored, a plurality of receiver tuning condition responsive means respectively associated with each of said receivers for producing transmittable signals indicative of the operating conditions of the associated ones of said receivers, conventional telephone subscriber wire facilities adapted to interconnect said central station with each of said means, means at said central station for initiating a selective connection through said telephone wire facilities to said receiver tuning condition responsive means, and means respectively located at each of said receivers and connected to said telephone wire facilities for completing the connection between said central office and said receiver tuning condition responsive means in response to a ringing signal of predetermined frequency supplied thereto over said telephone wire facilities.

3. In a system for indicating the tuning condition of a home wave signal receiver capable of receiving any one of a plurality of radiated carriers from transmitters located within the reception range of said receiver comprising a central station remote from the home in which said receiver is located, means including two subscribers' telephone lines and an interposed telephone exchange interconnecting said home and said central station, a telephone at said central station connected to one of said subscriber's telephone lines, a receiver attachment in said home adjacent said receiver, signal producing means in said receiver attachment, means interconnecting said receiver and receiver attachment including means for causing said signal producing means to produce signals uniquely representative of said different radiated carriers to which said receiver is tuned for signal reception, relay means connected to the other one of said subscriber's lines for connecting when energized the output of said signal producing means to said other subscriber's line whereby a signal uniquely representative of the radiated carrier tuned in by said receiver is transmitted to said central station, and means for energizing said relay means.

4. In a system for indicating the tuning condition of a home wave signal receiver capable of receiving any one of a plurality of radiated carriers from transmitters located within the reception range of said receiver comprising a central station remote from the home in which said receiver is located, means including two subscribers' telephone lines and an interposed telephone exchange interconnecting said home and said central station, a telephone at said central station connected to one of said subscriber's telephone lines, a receiver attachment in said home adjacent said receiver, signal producing means in said receiver attachment, means interconnecting said receiver and receiver attachment including means for causing said signal producing means to produce signals uniquely representative of said different radiated carriers to which said receiver is tuned for signal reception, actuable means connected to the other one of said subscriber's line for connecting when actuated the output of said signal producing means to said other subscriber's line whereby a signal uniquely representative of the radiated carrier tuned in by said receiver is transmitted to said central station, and means for actuating said actuable means.

5. In a system for indicating the tuning condition of a home wave signal receiver capable of receiving any one of a plurality of radiated carriers from transmitters located within the reception range of said receiver comprising a central station remote from the home in which said receiver is located, means including two subscribers' telephone lines and an interposed telephone exchange interconnecting said home and said central station, a telephone at said central station connected to one of said subscriber's telephone lines, a receiver attachment in said home adjacent said receiver, signal producing means in said receiver attachment for producing variable frequency signals, means interconnecting said receiver and receiver attachment including means for causing said signal producing means to produce a signal of unique frequency for each of said different radiated carriers to which said receiver is likely to be tuned for signal reception, relay means connected to the other one of said subscriber's lines for connecting when energized the output of said signal producing means to said other subscriber's line whereby a signal uniquely representative of the radiated carrier tuned in by said receiver is transmitted to said central station, means for energizing said relay means, filter means at said central station for selectively separating said signals of different frequency, and signal responsive means responsive to said separated signals at said central station for producing a record of the tuning conditions of said receiver.

6. In a system for indicating the tuning condition of a home wave signal receiver capable of receiving any one of a plurality of radiated carriers from transmitters located within the reception range of said receiver comprising a central station remote from the home in which said receiver is located, means including telephone subscriber wire facilities interconnecting said home and said central station, a telephone at said central station connected to said telephone subscriber facilities, a receiver attachment in said home adjacent said receiver, signal producing means in said receiver attachment, means interconnecting said receiver and receiver attachment including means for causing said signal producing means to produce different signals each uniquely representative of said different radiated carriers to which said receiver is tuned for signal reception, relay means connected to said telephone subscriber wire facilities for connecting when energized the output of said signal producing means to said telephone subscriber wire facilities whereby a signal uniquely representative of the radiated carrier tuned in by said receiver is transmitted to said central station, and means operable in response to a condition initiated at said central station for energizing said relay means for a predetermined interval of time.

7. In a system for indicating the tuning condition of a home wave signal receiver capable of receiving any one of a plurality of radiated carriers from transmitters located within the reception range of said receiver comprising a central station remote from the home in which said receiver is located, means including telephone subscriber wire facilities interconnecting said home and said central station, a telephone at said central station connected to said telephone subscriber facilities, a receiver attachment in said home adjacent said receiver, signal producing means in said receiver attachment, means interconnecting said receiver and receiver attachment including means for causing said signal producing means to produce different signals each uniquely representative of said different radiated carriers to which said receiver is tuned for signal reception, harmonic ringing current responsive relay means connected to said telephone subscriber wire facilities for connecting when energized the output of said signal producing means to said telephone subscriber wire facilities whereby a signal uniquely representative of the radiated carrier tuned in by said receiver is transmitted to said central station, and means for energizing said relay means.

8. In a system for determining the listening or viewing habits of wave signal receiver users from a location remote from said receiver users the combination of a plurality of receivers to be monitored, a central monitoring station, telephone wire facilities interconnecting said central monitoring station and each of the locations of said receivers, means at each receiver responsive to the tuning condition of said receiver for producing a transmittable signal indicative of said tuning condition, means at said central station for initiating the establishment of a connection between said station and any one of said receiver locations through said telephone subscriber wire facilities, and time delay means at each said receiver and independent of the tuning condition thereof for interrupting said last named connection a predetermined time after the initiation thereof.

9. In a system for monitoring the listening or viewing habits of wave signal receiver users wherein connection of a transmitting unit at each receiver to be monitored with a central monitoring station is initiated at the monitoring station, a transmitting unit comprising a signal generator producing a transmittable signal indicative of the tuning condition of one of said receivers, conventional telephone subscriber wire facilities, means responsive to a signal from said central station to couple said transmittable signal to said wire facilities, and means for automatically decoupling said transmittable signal from said wire facilities a predetermined time after the coupling thereto.

References Cited in the file of this patent
UNITED STATES PATENTS

| | | |
|---|---|---|
| 1,889,597 | Fitzgerald | Nov. 29, 1932 |
| 1,955,043 | Yates | Apr. 17, 1934 |
| 2,042,532 | Johnston | June 2, 1936 |
| 2,484,733 | Rahmel et al. | Oct. 11, 1949 |
| 2,573,279 | Scherbatskoy | Oct. 30, 1951 |
| 2,618,694 | Black | Nov. 18, 1952 |
| 2,630,366 | Rahmel | Mar. 3, 1953 |
| 2,674,512 | Bogert | Apr. 6, 1954 |

UNITED STATES PATENT OFFICE
CERTIFICATE OF CORRECTION

Patent No. 2,788,392 April 9, 1957

Fred Krahulec

It is hereby certified that error appears in the above numbered patent requiring correction and that the said Letters Patent should read as corrected below.

Column 16, line 3, strike out "subscriber".

Signed and sealed this 14th day of November 1961.

(SEAL)
Attest:

ERNEST W. SWIDER
Attesting Officer

DAVID L. LADD
Commissioner of Patents

USCOMM-DC